(12) United States Patent
Kim

(10) Patent No.: US 6,494,531 B1
(45) Date of Patent: Dec. 17, 2002

(54) VEHICLE SEAT FOR REVERSIBLE OCCUPANT TRAVEL

(76) Inventor: Hoon Y. Kim, 2400 W. Fullerton, Chicago, IL (US) 60647

( * ) Notice: Subject to any disclaimer, the term of this patent is extended or adjusted under 35 U.S.C. 154(b) by 0 days.

(21) Appl. No.: 09/480,407

(22) Filed: Jan. 11, 2000

Related U.S. Application Data

(63) Continuation-in-part of application No. 09/368,193, filed on Aug. 4, 1999, now Pat. No. 6,199,945.

(51) Int. Cl.⁷ .................................................. B60N 2/32
(52) U.S. Cl. ........................ 297/94; 297/95; 297/237; 297/238; 297/236; 297/256.16; 297/114; 297/383; 296/65.1; 296/64
(58) Field of Search .............................. 297/94, 95, 112, 297/114, 234, 238, 237, 236, 283.1, 383, 233, 256.16; 296/64, 65.16

(56) References Cited

U.S. PATENT DOCUMENTS

| | | | |
|---|---|---|---|
| 645,609 A | 3/1900 | Schellenbach | 297/94 |
| 1,429,368 A | 9/1922 | Owler et al. | 297/95 X |
| 2,007,471 A | 7/1935 | Landgrebe | 297/94 |
| 3,058,769 A | 10/1962 | Willson | |
| 3,097,876 A | 7/1963 | Willson | |
| 3,391,960 A | 7/1968 | Megargle et al. | |
| 4,555,135 A | 11/1985 | Freeland | 297/237 X |
| 4,756,573 A | 7/1988 | Simin et al. | 297/238 X |
| 5,000,505 A | 3/1991 | Kawashita et al. | 296/65.1 |
| 5,121,964 A | 6/1992 | Fourrey et al. | 297/237 |
| 5,322,341 A | 6/1994 | Harrison et al. | 297/94 |
| 5,335,963 A | 8/1994 | Muller et al. | |
| 5,409,293 A | 4/1995 | Nagaska | 297/236 |
| 5,524,962 A | 6/1996 | Fulgenzi et al. | 297/236 X |
| 5,524,965 A | 6/1996 | Barley | 297/256.16 |
| 5,549,353 A | 8/1996 | Gaudet et al. | 297/256.16 X |
| 5,639,141 A | 6/1997 | Hanemaayer | 296/64 X |
| 5,722,724 A | 3/1998 | Takei et al. | 297/114 X |
| 5,820,215 A | 10/1998 | Dreisbach | 297/256.16 |
| 6,199,945 B1 * | 3/2001 | Kim | 297/94 |

FOREIGN PATENT DOCUMENTS

| | | | |
|---|---|---|---|
| DE | 3800-896 | 9/1988 | 297/237 |
| EP | 348-374 | 12/1989 | 297/238 |
| GB | 323296 | 1/1930 | 297/383 |
| JP | 59-18028 | 1/1984 | 297/94 |

* cited by examiner

Primary Examiner—Rodney B. White
(74) Attorney, Agent, or Firm—Welsh & Katz, Ltd.

(57) ABSTRACT

A vehicle seat allowing an occupant to face in a first direction or a second direction comprising a seat frame and a seat base having a first seat back and a recess portion. Further, the vehicle seat provides a means for pivotally connecting the first seat back to the seat base and provides for the first seat back to be removably positioned within the recess. A back support assembly having a second seat back is operatively associated with said seat base.

18 Claims, 7 Drawing Sheets

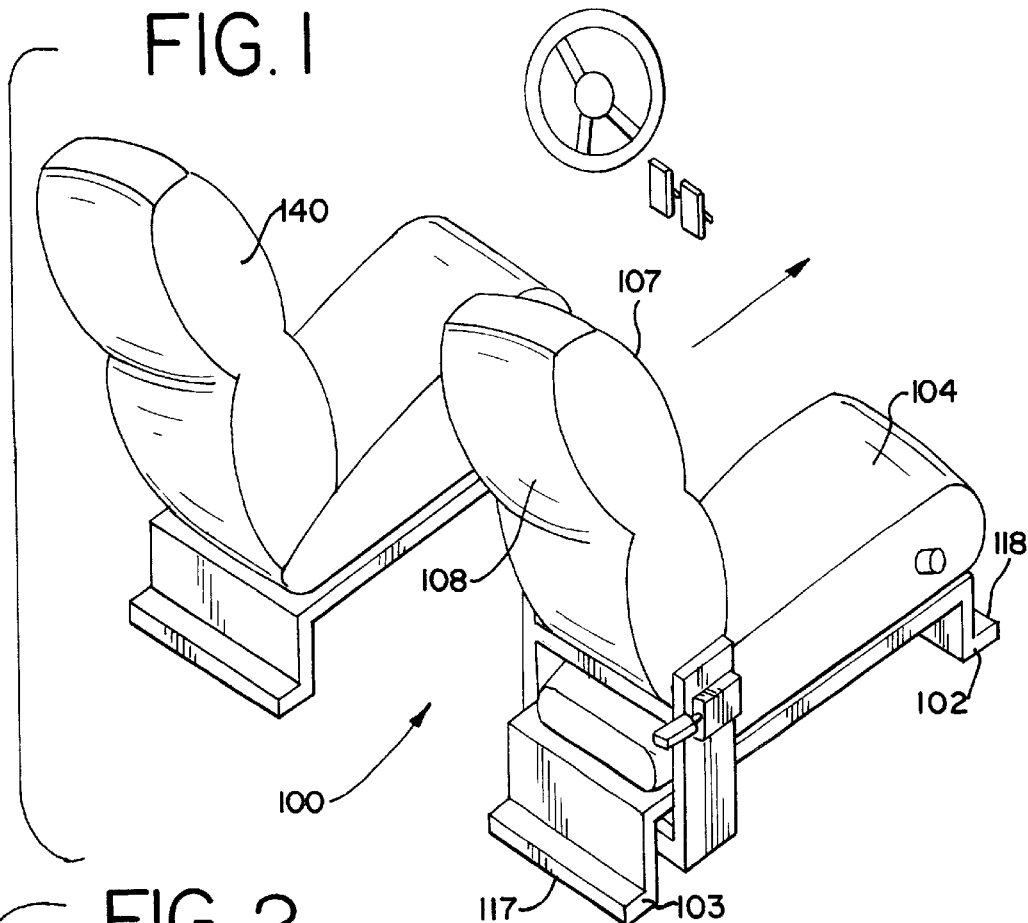
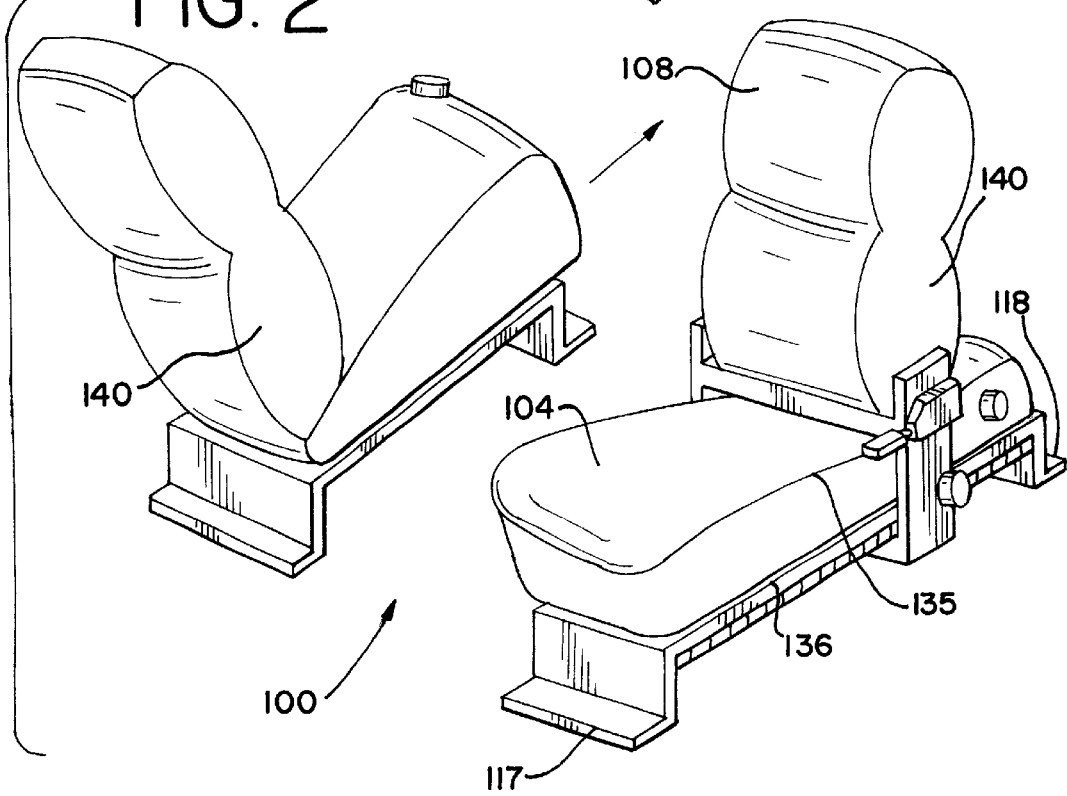

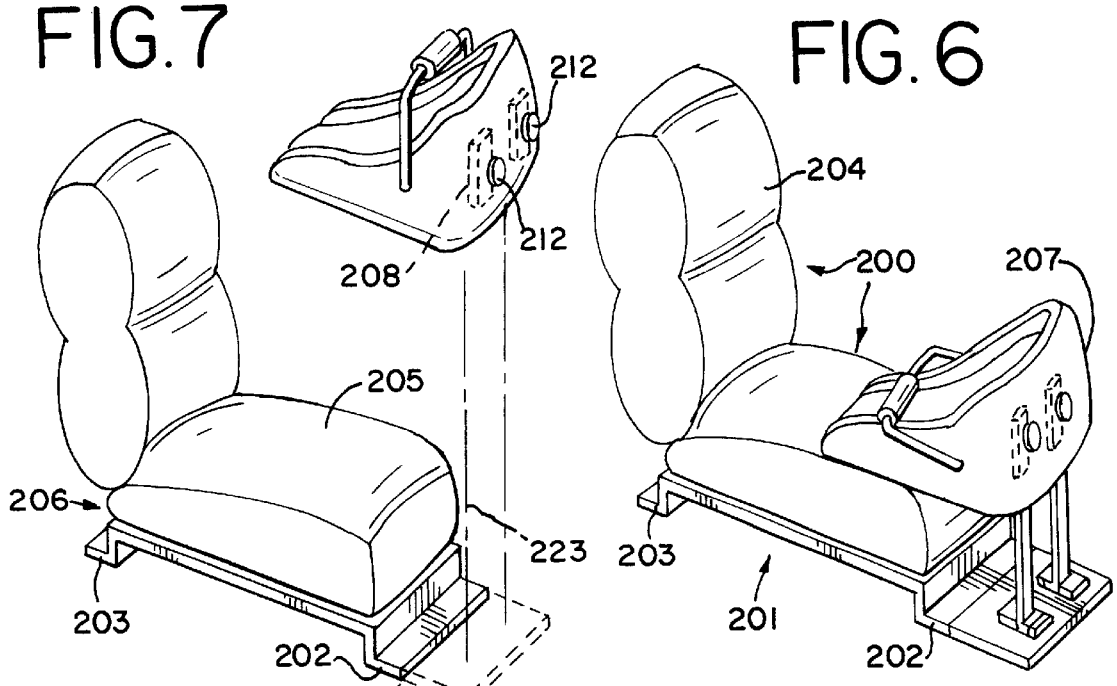
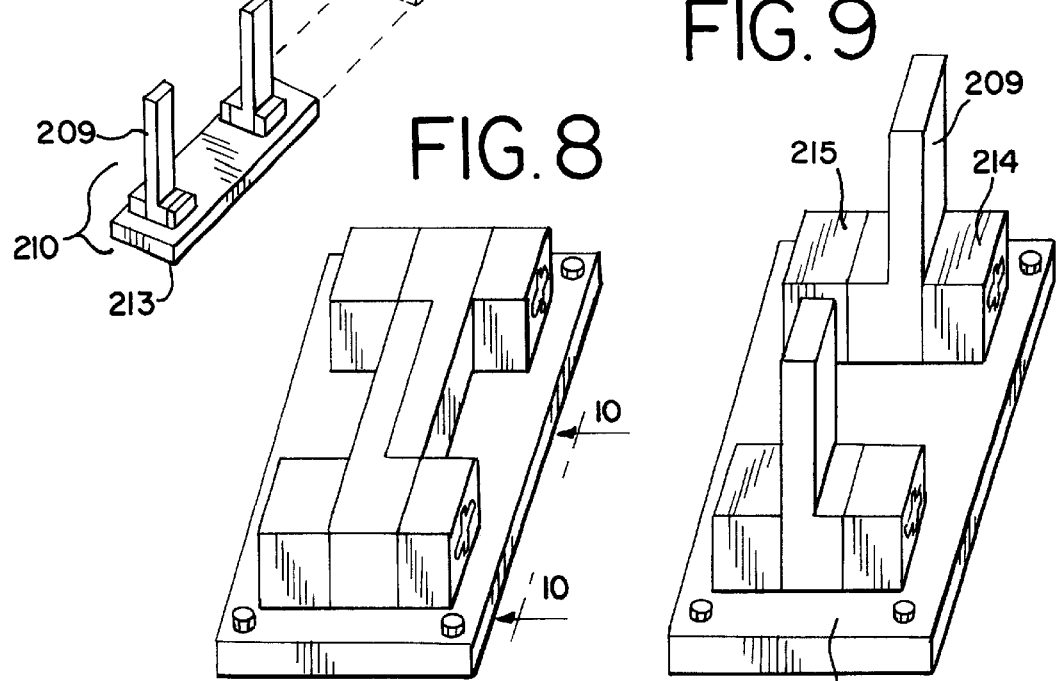
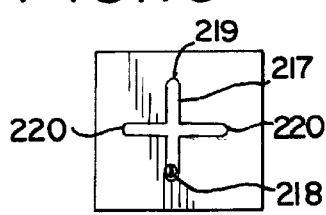
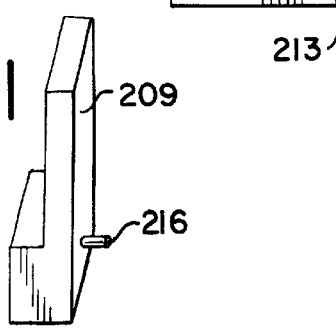

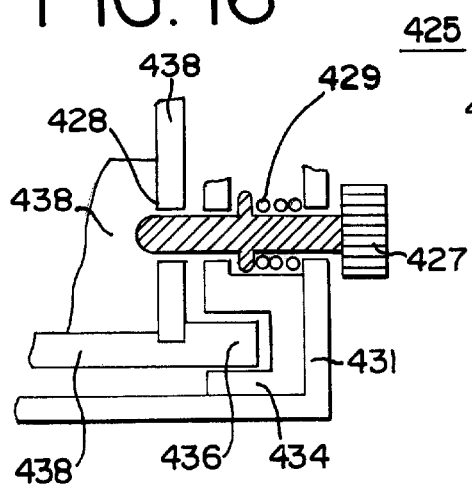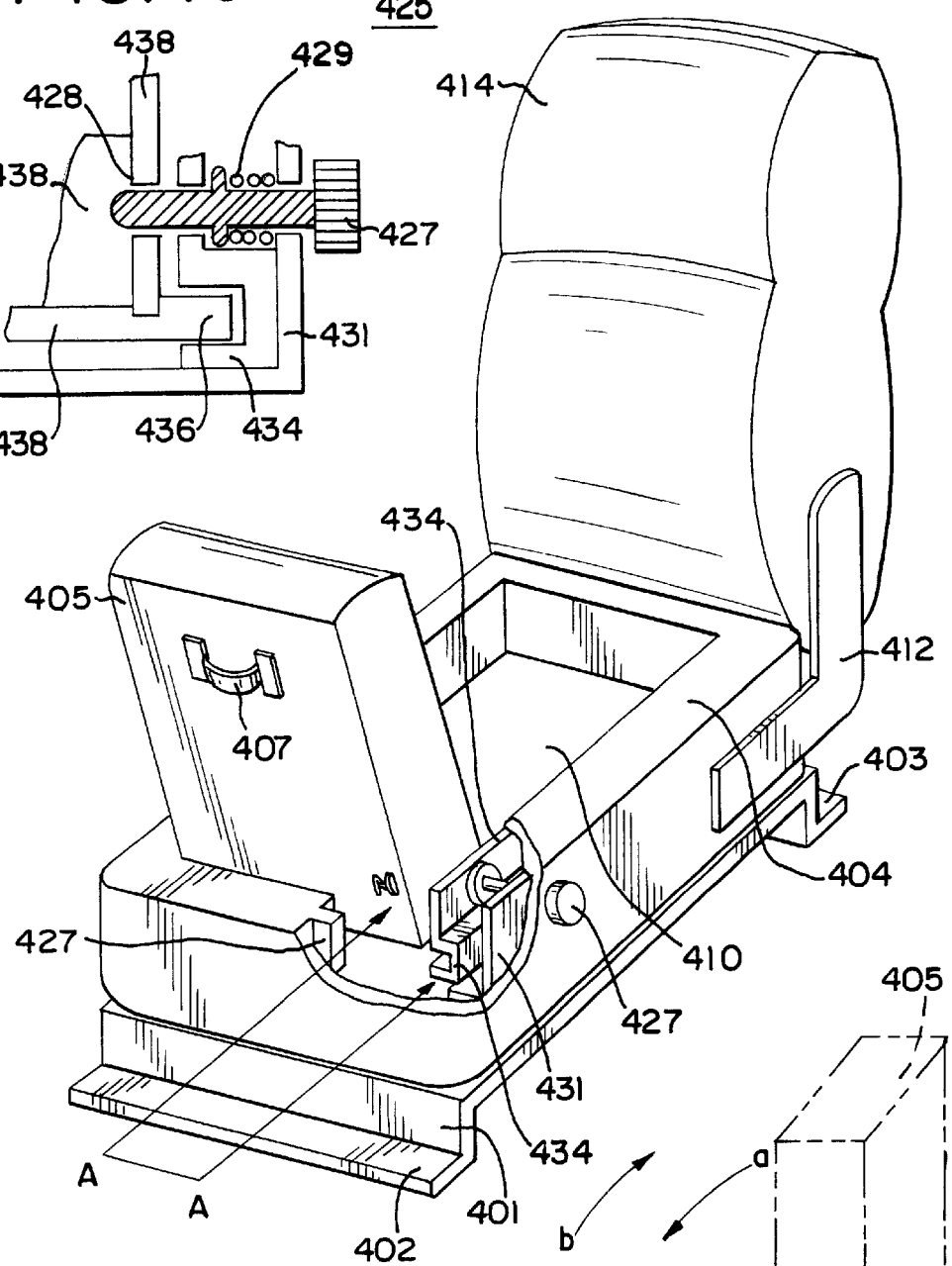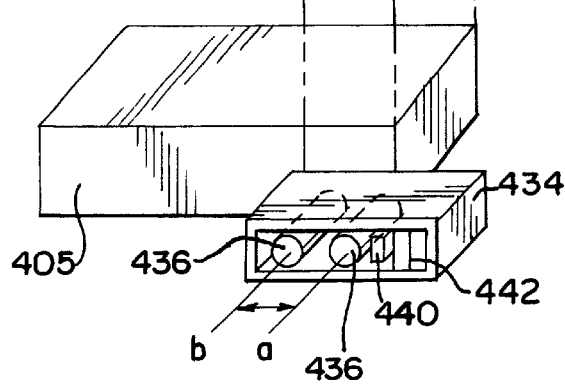

VEHICLE SEAT FOR REVERSIBLE OCCUPANT TRAVEL

This is a continuation-in-part application of U.S. Ser. No. 09/368,193, filed Aug. 4, 1999, now U.S. Pat. No. 6,199,945.

BACKGROUND OF INVENTION

The present invention generally relates to vehicle occupant seats, and in particular to new and improved occupant seat assemblies wherein the seat assemblies may be modified to enable an occupant to face opposite the vehicle's normal forward traveling direction.

Vehicle occupant safety, particularly the safety of small children and infants is a major concern to both vehicle owners as well as vehicle manufacturers. In most vehicles, the occupant seats are oriented in a forward-facing position. Conventional vehicle seats, for example, include backrests engaged by the occupant's back while disposed on the set facing in the forward direction of normal vehicle travel. In the event of a sudden stop, such as generally occurs in a vehicle front or rear end collision, the occupant will generally be subjected to a sudden force of inertia acting in the direction of vehicle travel. The potential for injury resulting from such collisions has been reduced somewhat by the mandatory use of seat belts. Although seat belts have proven to be relatively safe for adults, the same cannot be said for small children and infants. Moreover, forward-facing vehicle seats, and particularly front seats, subject children to numerous front seat hazards, such as high-pressure air bags, and generally provide inadequate child restraint systems even with contemporary children's car seat. It is highly important that a vehicle provide the utmost safety for all occupants large and small. It is also important that added vehicle safety remain affordable for car owners as well as manufacturers.

Most forward-facing vehicle seats are fixed in a forward directed position and are incapable of modification to improve safety by reducing the inertia forces imparted to forwardly facing passengers in the event of a collision or the like. Attempts have been made to provide adjustable vehicle passenger seats that may be positioned for forwardly facing or rearwardly facing passenger use. However, known vehicle passenger seats adaptable for both forwardfacing and rearward-facing positions are generally relatively complex and expensive, and require at least a 180 degree seat base rotation.

The known reverse-adjustable vehicle seat designs require a complete redesign of the entire base of the seat in order to incorporate both a forward and rearward-facing feature. Thus, a need exists for a vehicle assembly that overcomes the disadvantages of known vehicle seats and provides safety for infants and small children, as well as adults.

SUMMARY OF THE INVENTION

One of the primary objects of the present invention is to provide a vehicle seat for safer travel, wherein the vehicle seat enables for occupant travel facing in a forward or first position, and is reversible to enable for occupant travel facing in a rearward or second position, such that in a vehicle collision, the back rest substantially offsets forward inertia forces acting on the occupant and provides spinal support protection from high-pressure air bags and shattering windshield glass and the like.

A more particular object of the present invention is to provide a safety vehicle seat enabling occupant travel in a forward-facing or rearward-facing position without rotating the seat base or seat frame and wherein the seat has a first backrest for occupant travel facing in a first direction and a second backrest for occupant travel facing in a second direction.

In accordance with one embodiment of the present invention, the vehicle safety seat has a slidable back support assembly including a first backrest, to provide occupant travel facing in a forward or first position, a second backrest to enable occupant travel facing, in rearward or second position, and a slide assembly to enable movement of the back support assembly such that an occupant or operator can longitudinally slide the back support assembly along a seat frame into a selection position.

In accordance with another embodiment of the present invention, a first vehicle seat backrest is pivotally mounted to a seat frame to enable occupant travel facing in a forward or first position, a second backrest sits on top of the seat frame to enable occupant travel facing in an opposite rearward or second position, and a mounting assembly is mounted to the vehicle floor and to provide releasable support to the second backrest.

In accordance with still another embodiment of the present invention, a first vehicle seat backrest of the vehicle seat is pivotally mounted to a seat frame for occupant travel facing in a forward or first position and is pivotal into a lowered generally horizontal position, contacting the seat base, and a second backrest is mounted on top of the first backrest and forms a second seat base such that an occupant seated on the second seat base with the occupant's back resting against the second backrest faces in a rearward or second position.

In still yet another embodiment of the invention, a vehicle seat is provided that enables a child to travel more safely in a vehicle whereby the child may sit on the vehicle seat and face the opposite direction of vehicle travel.

Further objects, features and advantages of the present invention will become apparent from the following detailed description when taken in conjunction with the accompanying drawings wherein like reference numerals designate like elements throughout several views.

BRIEF DESCRIPTION OF THE DRAWINGS

FIG. 1 is a perspective view of an embodiment of a vehicle seat assembly in accordance with the preset-invention that enables modification for rearward facing passenger seating;

FIG. 2 is a perspective view of the vehicle seat assembly of FIG. 1 but illustrating the movable backrest portion in a forward position on the set base to facilitate rearward facing passenger seating;

FIG. 6 is a perspective view of a vehicle seat assembly in accordance with another embodiment of the present invention that enables an infant or small child to sit in a rearwardly facing position;

FIG. 7 is an exploded perspective view of the vehicle seat assembly of FIG. 6;

FIG. 8 is a perspective view of the mounting assembly for the child restraint seat of FIG. 6 but with the pivotal support bars in down non-use positions;

FIG. 9 is a perspective view similar to FIG. 8 but showing the pivotal support bars in upright support positions;

FIG. 10 is an elevational view taken along line 10—10 of FIG. 9, showing a cross-shaped slot to receive a pivotal support bar.

FIG. 11 is a perspective view of a pivotal support bar, employed in the mounting assembly of FIG. 9 with a guide pin;

FIG. 15 is a perspective view of a vehicle seat assembly of FIG. 14A shown with the rearwardly facing seat in the upright position and with portions broken away to show the frame locking system that enables an infant or small child to sit in a rearwardly facing position;

FIG. 16 is an elevational view of the frame locking system taken along lines A–A' of FIG. 15.

FIG. 17 is a perspective view of a portion of the frame locking system and the pop-up seat back of FIGS. 14A and 14B with the seat back shown with solid lines in the down position and show i phantom lines in the upright position.

DETAILED DESCRIPTION

Figure 3:
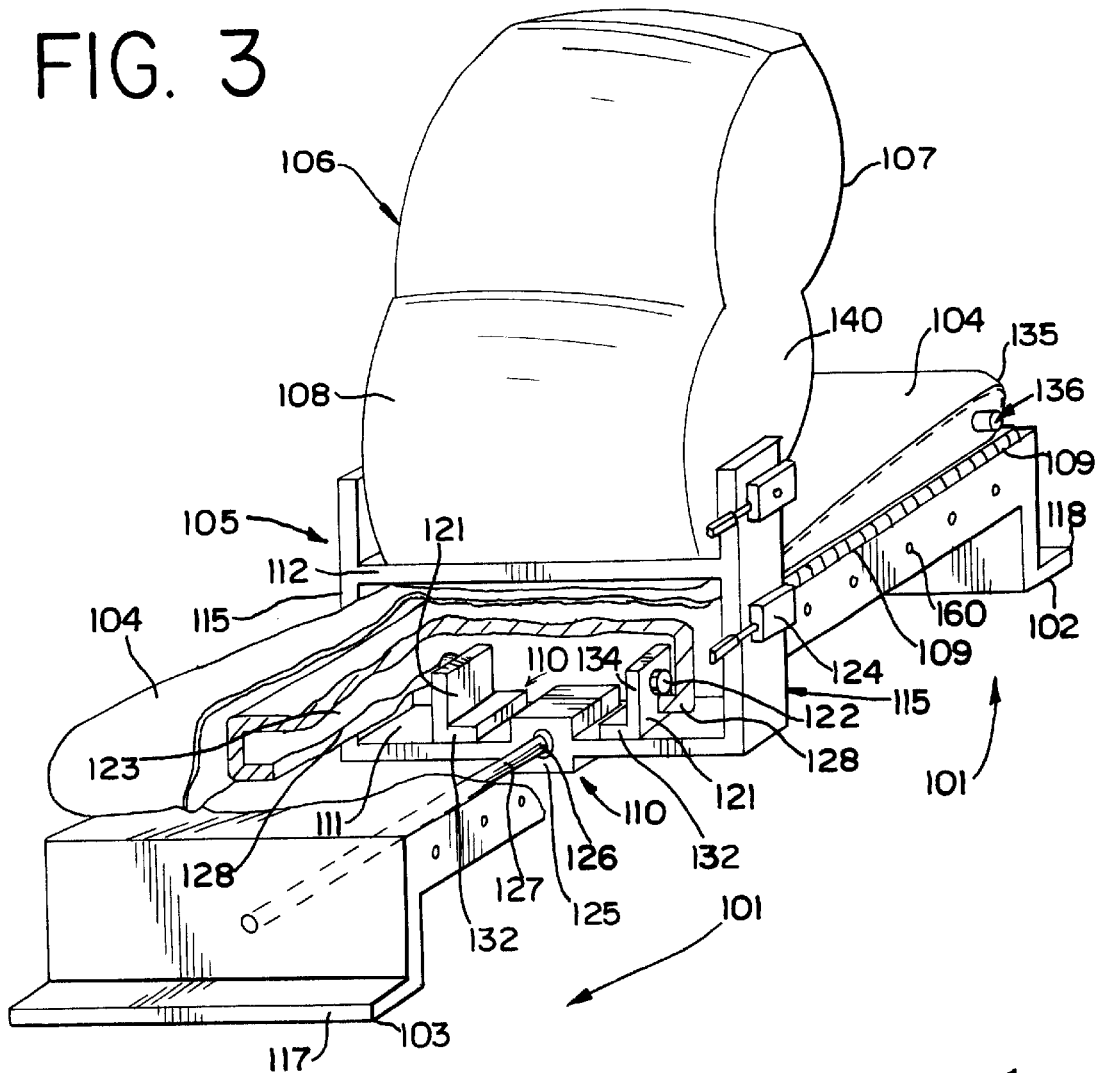
FIG 3 is a perspective view of the movable backrest assembly of FIG. 1 but with the back support assembly moved to a position mid-length of the seat base and with portions broken away to illustrate the backrest positioning mechanism.
Figure 4:
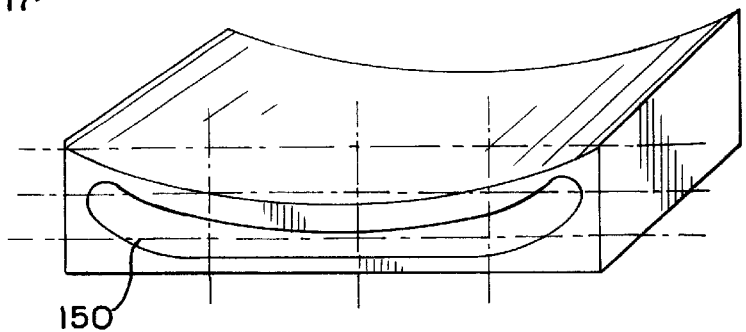
FIG. 4 is a perspective view schematically illustrating the contour of the cushion type seat base employed in the seat assembly of FIGS. 1 and 3 when the backrest is positioned generally midlength of the seat base.

Referring now to the drawings, and in particular to FIGS. 1–5, a vehicle seat 100 for a vehicle (not shown) is constructed in accordance with one embodiment of the present invention. The vehicle seat 100 provides for both occupant travel facing in a forward or first direction, and occupant travel facing in a rearward or second direction. The vehicle seat 100 includes a seat frame 101 having a front flanged edge 102 and a posterior flanged edge 103 for securing the vehicle seat directly to the vehicle floor (not shown). Alternatively, the seat frame 101 can be mounted to a conventional slidable track (not shown) enabling forward and backward positioning of the seat frame 101, if desired.

The vehicle seat 100 includes a seat base 104 mounted on top of the seat frame 101, a back support assembly 105 and a slide assembly 110. The seat base 104 covers the seat frame 101, preferably in a manner spanning an entire length and width of the seat frame 101. The seat base 104 provides cushioned support for a seated occupant and has a variable thickness (t), defined by a top surface 135 and a bottom surface 136 of the seat base 104.

The back support assembly 105 enables occupant travel facing in a forward or first direction and occupant travel facing in a rearward or second direction. The back support assembly 105, including a backrest structure 106, plural support bars 115, and a first mounting plate 111. The backrest structure 106 rests in a generally vertical position, transverse to the seat frame 101. The backrest structure 106 is an integral structure with dual surfaces comprising a first backrest 107 and a second backrest 108 positioned in opposite directions.

When the back support assembly 105 is positioned at the posterior end 117 of the seat frame 101, the first backrest 107, in combination with the seat base 104 and seat frame 101 provide for occupant travel facing in a forward or first direction. To interchangeably provide for occupant travel facing in a rearward or second direction, the back support assembly 105 slides longitudinally from the posterior end 117 of the seat frame 101 to the front end 118 of the seat frame 101. In this arrangement, an occupant resting his back against the second backrest 108, faces in a rearward or second direction.

The back support assembly 105 engages an external track 109 and a slide assembly 110. The external track 109 and slide assembly 10 cooperatively facilitate longitudinal movement of the back support assembly 105 along the frame 101.

The back support assembly has support bars 115, which are vertically aligned with a side portion 140 of the backrest structure 106. The side portion 140 of the backrest structure 106 is pivotally mounted to the support bars 115. Preferably, the support bars 115 are bolted or coupled to a lower end of the side portion 140 of the backrest structure 106, in a manner enabling radial adjustment of the backrest structure 106. A radial positioning lever provides radial movement of said backrest structure 106 such that an occupant may adjust the backrest structure 106 to lock in an angular position comfortable for the occupant.

The support bars 115 are attached underneath the seat frame 101 with an interposing first mounting plate 111 as illustrated in FIG. 1. The first mounting plate 111 has two end portions, which are connected to the support bars 115. It is preferable that the first mounting plate 111 is welded to the support bars 115 for an optimally strong connection.

As previously mentioned, the slide assembly 110 facilitates the longitudinal sliding movement of the back support assembly 105 along the set frame 101. The slide assembly 110 includes a coupling member 121, which connects the first mounting plate 111 of the back support assembly 105 to a sliding member 122. Preferably, the coupling member 121 has a L-shaped cross-section, as seen in FIG. 3, providing a lower flanged portion 132 for connection to the first mounting plate 111 and an upright portion 134 for connection to the sliding member 122. The L-shaped coupling member 121 can be used in conjunction with a second L-shaped coupling member 121 such that cooperatively each coupling member 121 connect a sliding member 122 to the mounting plate 111, as seen in FIG. 3.

The sliding member 122 cooperatively engages an internal track 123 as illustrated in FIG. 3, such that the sliding member 122 slides along the internal track 123. The sliding member 122 can be a roller, a bearing, a slide rod, or any other device, which provides for low friction sliding in conjunction with an internal track 123.

The internal track 123 is mounted on an opposite side of the seat base 104, which may also be defined as an underside portion of the seat frame 101. The internal track 123 extends from the posterior end 117 of the set frame 101 to the front end 118 of the set frame 101 providing a flanged rail 128 for the sliding member 122 to slide from one end of the seat frame 101 to the other end. The internal track 128 may have two or more flanged rails 128 for engagement with multiple sliding members 110, if desired.

The slide assembly 110 includes a cylinder housing 125 and a longitudinal guide rail 127 for providing additional stability to the slide assembly 110 when the back support assembly 105 slides longitudinally along the seat frame 101. The cylinder housing 125 is preferably mounted on top of the first mounting plate 111 in a center portion of the plate to provide maximum support. The cylinder housing 125 has a bore 126 for engaging the longitudinal guide rail 127. The longitudinal guide rail 127 is rigidly connected to the posterior end 117 and frontal end 118 of the seat frame 101 in a manner that provides stabilization of the back support assembly 105 when the back support assembly 105 slides longitudinally along the seat frame 101.

The back support assembly 105 includes a longitudinal positioning lever 129, which operatively engages the external track 109 to control longitudinal positioning of the back support assembly 105 relative to the seat frame 101. The external track 109 is mounted to the side portion of the seat frame 110, extending from the posterior end 117 of the seat frame 101 to the front end 118 of the set frame 101. The longitudinal positioning lever 129, in a locked position, engages the external track 109, preventing movement of the back support assembly 105 along the external track 109 of the seat frame 101. For example, the longitudinal positioning lever 129 can have a stop (not shown), which rigidly engages a slot 160 on the external track thereby locking the back support assembly 105 in position.

The longitudinal positioning lever 129, in an unlocked position, provides free movement of the back support assembly 105 along the seat frame 101 and external track 109, such that the back support assembly 105 slides from the posterior end 117 of the seat frame 101 to the frontal end 118 of the seat frame 101.

Figure 5:
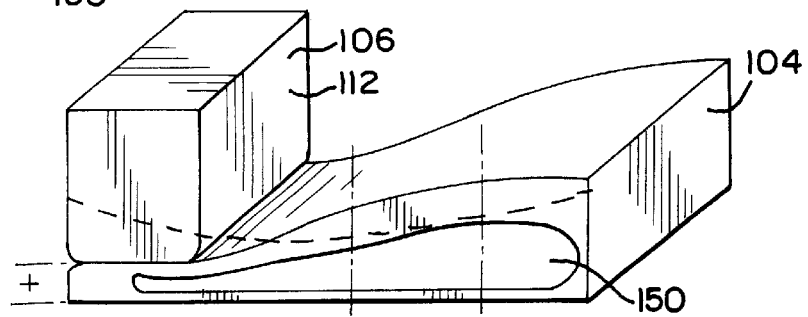
FIG. 5 is a perspective view of the cushion type set base of FIG. 4 but schematically showing the seat base contour with the backrest applying pressure to an end of the inflated seat base.

As illustrated in FIG. 5, the seat base 104 has an inner chamber 150 containing an impressionable mass (not shown) to provide a resilient cushion. The mass can be fluid such as a gas or liquid or any combination thereof. The thickness (t) of the seat base 104 at a particular location depends on the volume of mass in the inner chamber 150 at that particular portion. The thickness (t) of the seat base 104 at a certain location varies such that when the volume of mass in the inner chamber 150 at a portion decreases, the thickness (t) of the seat base 104 at that corresponding location decreases. Conversely, when the volume of mass at a portion in the inner chamber 150 increases, the thickness (t) of the seat base 104 at that location increases.

The seat base 104 deforms such that when the back support assembly 105 is positioned at the posterior end 117 of the seat frame 101, a bottom portion of the backrest structure 106 depresses the seat base 104 at the posterior end 117, urging the matter inside the chamber to move from the posterior end 117 of the seat base 104 toward the front end 118, thereby increasing the thickness of the seat base at the front end 118, as illustrated in FIG. 5.

Furthermore, when the back support assembly 105 is positioned at the front end 118 of the seat frame 101, the bottom of the backrest structure 106 depresses the seat base 104 at the front end 118, causing the mass inside the chamber 150 to shift from the front end 118 of the seat base 104 toward the posterior end 117, thereby increasing the thickness of the seat base at the posterior end 117.

If desired, a second mounting plate 112 can be mounted underneath the backrest structure 106 in a position interposed between the support bars 115 such that the second mounting plate 112 depresses the seat base 104 and provides additional support to the back support assembly.

FIGS. 6 and 7 illustrate a vehicle seat 200 constructed in accordance with another embodiment of the present invention. The vehicle seat 200 provides occupant travel in both a forward-facing and rearward-facing position. The vehicle seat 200 comprises a set frame 201 having a front flanged edge 202 and posterior flanged edge 203 for securing the vehicle seat 201 to the vehicle floor (not shown). Alternatively, the set frame 202 can be mounted to a conventional slidable track (not shown) on the vehicle floor enabling forward and backward adjustment of the seat frame 102, if desired.

The vehicle seat 200 has a first backrest 204 positioned for occupant travel facing in a forward position or first direction. The seam frame 201 supports a seat base 205 and the first backrest 204. The first backrest 204 is pivotally connected to the posterior end 206 of the seat frame 201 such that a seated occupant, resting his back against the first backrest 204 faces in a forward position or a first direction.

The vehicle seat 200 has a second backrest 207, providing for occupant travel facing in a rearward position or second direction. The second backrest 207 is mounted to the top of the seat base 205. The second backrest 207 can be an assembly for carrying a baby as illustrated in FIGS. 6 and 7. The lower end of the second backrest 207 has a bore 208 for receiving a support bar 209 of a mounting assembly 210. The support bar 209 is inserted into the bore 208 and securely tightened to the inner wall of the bore 208 with a fastening screw 211. The fastening screw 211 engages the support bar 209, while inside of the bore 208, such that the support bar 209 abuts the inner wall of the bore 208. The fastening screw 211 has a turning knob 212 for tightening the abutment of the fastening screw 211, support bar 209, and the inner wall of the bore 208.

The mounting assembly 210 has a generally rectangular-shaped planar mounting plate 213, which can be securely connected to the floor of the vehicle, preferably adjacent to the front flanged edge 202 of the seat frame 201. Alternatively, instead of securing the mounting assembly 210 to the vehicle floor, the mounting assembly 210 can be directly attached to the front end 223 of the seat frame 201, if desired (not shown).

The mounting assembly 210 includes a mounting plate 213, a support bar 209 and a first housing 214, and an identical second housing 215. The support bar 209 is pivotally mounted between the first and second housings 214, 215, as illustrated in FIGS. 8 and 9. The lower end of the support bar 209 has a guide pin 216, as illustrated in FIG. 11. The first and second housings 214, 215 have a guide slot 217 located preferably in the center of the housings, which receives the guide pin 216. The guide slot 217 is preferably cross-shaped, having a lower branch 218, an upper branch 219 and adjacent side branches 220,220 as illustrated in FIG. 10.

The guide pin 216 locks in the guide slot branches 218 and 220, preventing movement of the support bar 209, when the support bar 209 is positioned in an upright or lowered position. The guide pin 216 locks into the lower branch 218 of the guide slot 217, preventing lateral movement of the support bar 209, when the support bar 209 is in an upright position. The guide pin 216 locks in a side branch 220 of the guide slot 217, when the support bar 209 is in a lowered position. The support bar 209 may be pivotally moved from an upright position, as illustrated by FIG. 8 into a lowered position as illustrated by FIG. 9, by pulling the support bar 209 upward and rotating the support bar 209 approximately 90 degrees, about the y-axis, into a position parallel relative to the mounting plate 213. The support bar 209 may be pivotally moved from a lowered position into an upright position by rotating the bar approximately 90 degrees, about the y-axis, from a lowered position, into an upright position and locking the guide pin 216 into the lower branch 218 of the guide slot 217.

Additional support to the second backrest 207 is provided by using plural support bars 209 and plural housing combinations attached to the mounting plate 213 such that the plural support bars 209 engage plural bores 208 in the second backrest 207. The plural support bars 209 interlock in a lowered position, as seen in FIG. 8.

Figure 12:
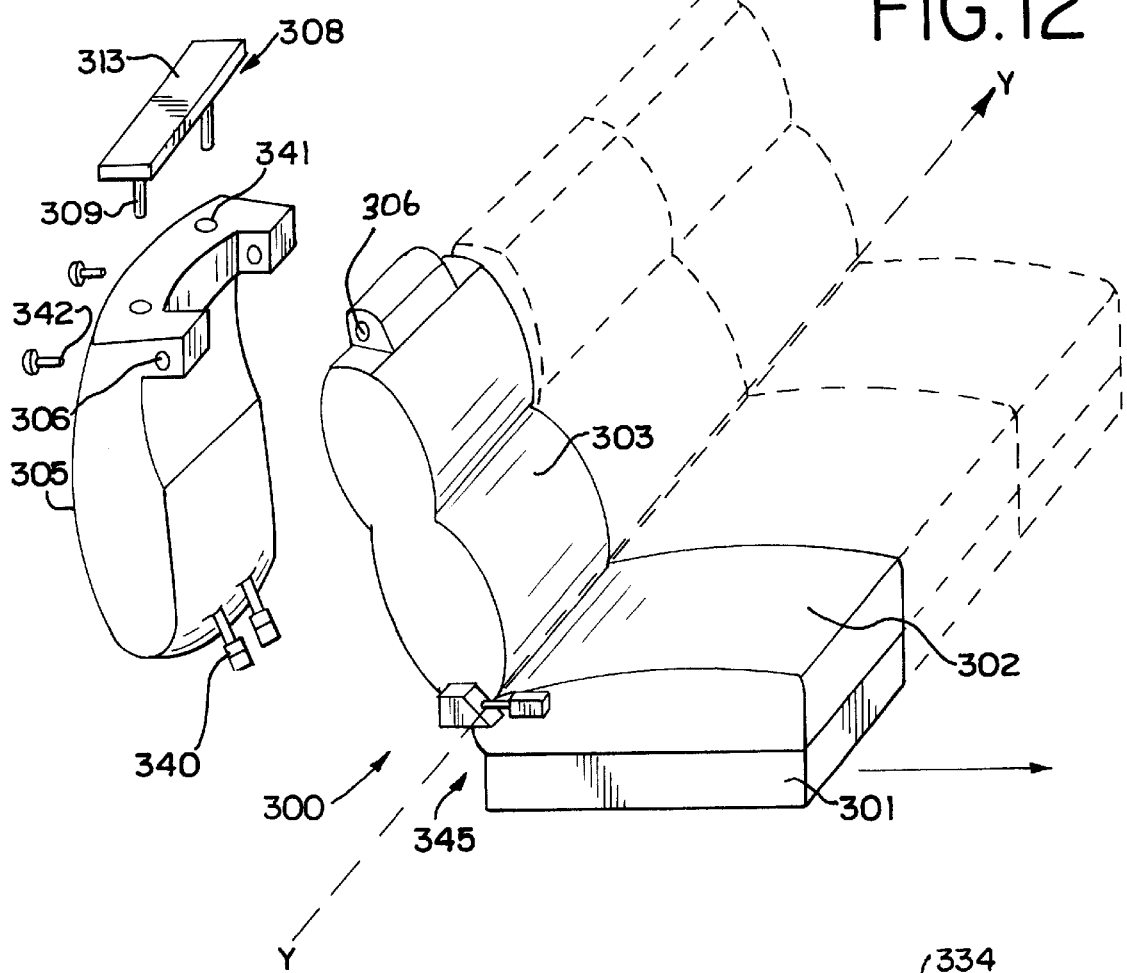
FIG. 12 is a perspective view of another embodiment of a vehicle seat assembly in accordance with the present invention that enables rearwardly facing passenger seating.
Figure 13:
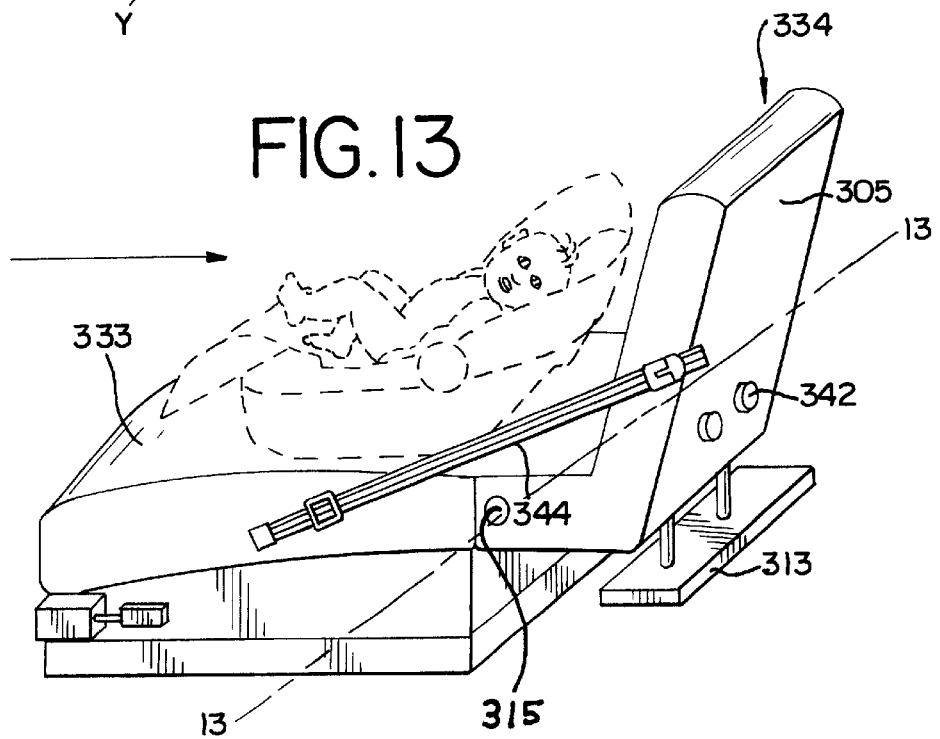
FIG. 13 is an exploded perspective view of the vehicle seat assembly of FIG. 12 but showing the primary backrest returned to its upright position for storing the forward or secondary backrest.

A vehicle seat 300 in accordance with another embodiment of the present invention is illustrated in FIGS. 12 and 13. The vehicle seat 300 includes a seat frame 301, which provides support to a seat base 302. The seat frame 301 has a first backrest 303, which is pivotally connected to the posterior end 345 of the seat frame 301. When the first backrest 303 is positioned in an upright position as shown in FIG. 12, an occupant seated on the seat base 302 faces in a forward position or first direction. A second backrest 305 may be mounted to a back portion 333 of the first backrest 303 providing storage for the second backrest 305 as illustrated in FIG. 12.

The vehicle seat 303 can be modified to provide occupant travel facing in a rearward position or a second direction. This is accomplished by pivoting the first backrest 303 (about the y-axis) from the upright position into a lowered position, as illustrated in FIG. 13. In this configuration, the face of the first backrest 303 horizontally engages the seat base 302 in a parallel position. The back surface 333 of the first backrest 303 form a second seat base 333. As illustrated in FIG. 13 the second backrest 305, is pivotally connected to the vehicle seat 300, particularly to the first backrest 303, such that an occupant seated on the second seat base 333 with his back resting against the second backrest 305, faces in a rearward position or second direction.

The upper portion of the first backrest 303 has slotted-bores 306 such that the lower portion of the second backrest 305 may be securely hinged to the upper portion of the first backrest 303 along a hinged axis (line 13—13) using any form of bolting or coupling means 315. The second backrest 305 is hinged to the upper portion of the first backrest 303 such that the second backrest 305 forms a second occupant seat 334.

As aforementioned in the previous embodiment, a mounting assembly 308, particularly a support bar 309 is inserted into the lower portion of the second backrest 305 through a bore 341. The support bar 309 is securely fastened to the inner wall of the bore 341 by a fastening screw 342. The fastening screw 342 is inserted into the back of the second backrest 305, securely fastening the support bar 309 to the inner wall of the bore 341. The mounting plate 313 is securely mounted to the inside of the vehicle. A hinged rod 344 connects preferably the middle portion of the first backrest 303 to preferably the middle portion of the second backrest 305 such that the second backrest 355 is prevented from moving along the hinged axis (13—13). If desired, plural hinged rods 344 can be used for connecting the sides of the first and second backrests 303, 305 for additional support. The second backrest 305 has a seat belt 340 for securing an occupant to the vehicle seat 300.

Figure 14B:
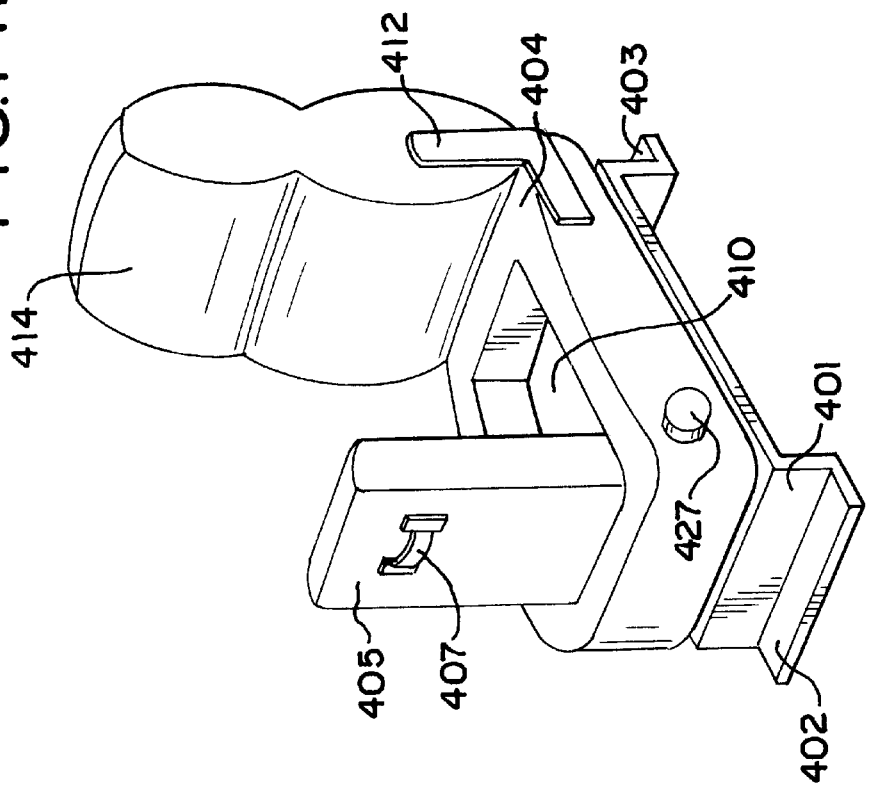
FIG. 14B is a perspective view of a vehicle seat assembly of FIG. 14A shown with the rearwardly facing seat in the upright position that enables an infant or small child to sit in a rearward facing position.
Figure 14A:
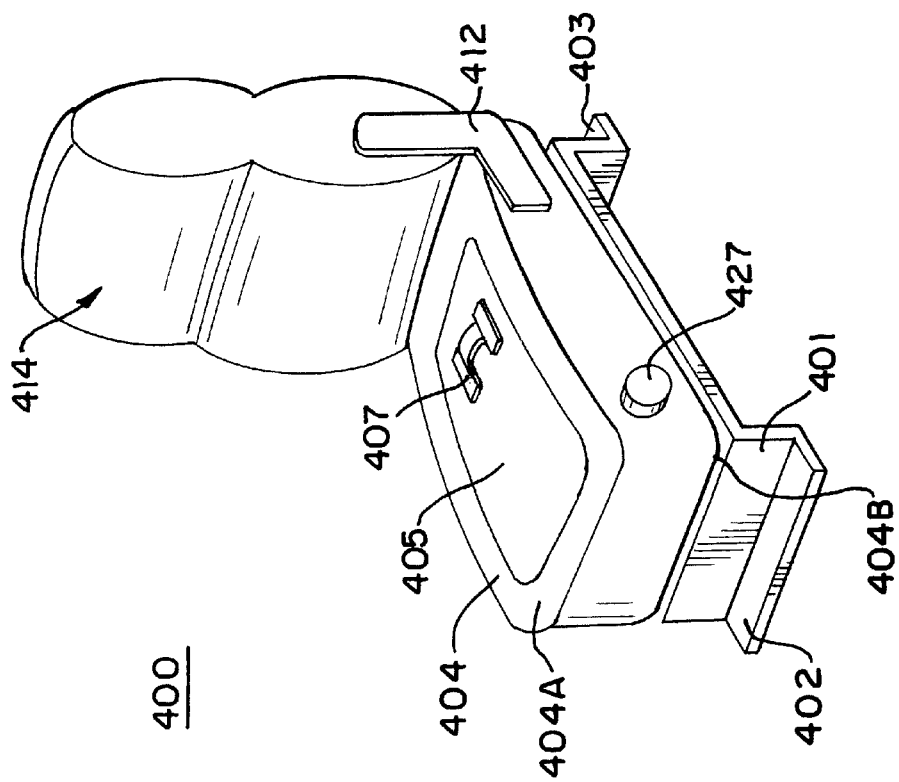
FIG. 14A is a perspective view of an alternate embodiment of a vehicle seat assembly in accordance with the present invention shown with the rearwardly facing seat in the down position.

FIGS. 14A, 14B and 15, show a vehicle seat 400 for a vehicle (not shown) constructed in accordance with one embodiment of the present invention. The vehicle seat 400 provides for both occupant travel facing in a forward or first direction, and occupant travel facing in a rearward or second direction. The vehicle seat 400 may include a seat frame 401 having a front flanged edge 402 and a posterior flanged edge 403 for securing the vehicle seat 400 directly to the vehicle floor (not shown). Alternatively, the seat frame 401 may be mounted to a conventional slidable track (not shown) enabling forward and backward horizontal positioning of the seat frame 401 with respect to the vehicle floor, if desired by a passenger.

The vehicle seat 400 may include a seat base 404 mounted on top of the seat frame 401, a back support assembly 412 and a seat back 414. When the back support assembly 412 is positioned at the posterior end 403 of the seat frame 401, the seat back 414, in combination with the seat base 404 and seat frame 401 provide for occupant travel facing in a forward or first direction. Seat back 414 may be pivotally connected to back support assembly 412 so that seat back 414 may be adjusted by the user to fit his or her preferred seating arrangement. The seat base 404 may cover the seat frame 401 and may span an entire length and width of seat frame 401. Seat base 404 may provide cushioned support for a seated occupant and may have a variable thickness (t), defined by a top surface 404a and a bottom surface 404b of the seat base 404. Located within seat base 404 may be an inner seat frame 431, as shown in FIG. 15.

Positioned within seat base 404 may be a pop-up seat back 405. As shown in FIGS. 15–16, seat back 405 may comprise a lifting device 407, such as a handle, an inner support frame 438 and one or more frame locking systems 425. The frame locking system 425, which also may provide for pivotably mounting the seat back 405 to the seat base 404, may be located substantially as shown in FIGS. 15–17 and may comprise a frame locking rod 427, a locking hole 428 defined by and positioned in an inner support frame 438, a spring 429 positioned over the locking rod 427, a shaft guide 434, a shaft 436 fixed to the inner support frame 438, a spring plate 440 and a spring 442. As shown in FIG. 14A, seat back 405 may be in the downward position or as shown in FIG. 14B, seat back 405 may be easily moved to the upward position by pulling on lifting device 407, such as for example a handle. When seat back 405 is in the upward position, hidden seat 410, formed by a recess for example in seat base 404, is visible and ready for use. In one embodiment of vehicle seat 401, a child may sit in seat 410 and rest his or her back against seat back 405. In this configuration, the child would be facing in the direction opposite to the vehicle's traveling direction. In another embodiment, an infant carrier seat, which is commonly know in the art, may fit in and be secured in the seat 410.

As shown in FIGS. 15-17, during use, a user pulls on lifting device 407 which pulls open pop-up seat back 405 and exposes to view hidden seat 410. As seat back 405 is being opened, seat back 405 may pivot with respect to seat base 404 and shaft 436 may move substantially horizontally through shaft guide 434 from position "a" to position "b" as shown in FIG. 17. Once seat back 405 is completely in the upright position, frame locking rod 427, which may be pulled back against the force of spring 429, is then released and the rod 427 travels into locking hole 428 which is located in the seat back's inner support frame 438. Once the rod 427 is fully positioned in hole 428, the seat back 405 may be firmly locked in position with respect to the seat base 404. Further, as shown in FIG. 17, in another embodiment, a spring plate 440 and spring 442 may be positioned within the shaft guide 434 substantially as shown in FIG. 17. In this embodiment, as the shaft 436 travels toward the "b" position, the spring 442 and spring plate 440 press against the shaft 436 and contribute to the opening of the seat back 445.

Figure 18:
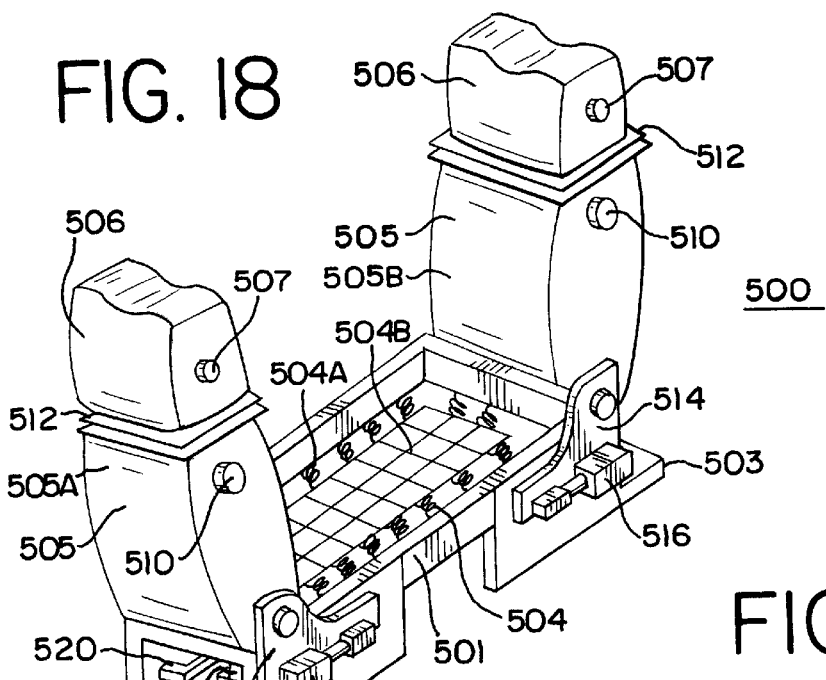
FIG. 18 is a perspective view of an alternate embodiment of a vehicle seat assembly in accordance with the present invention that enables modification for rearward facing passenger seating.
Figure 19:
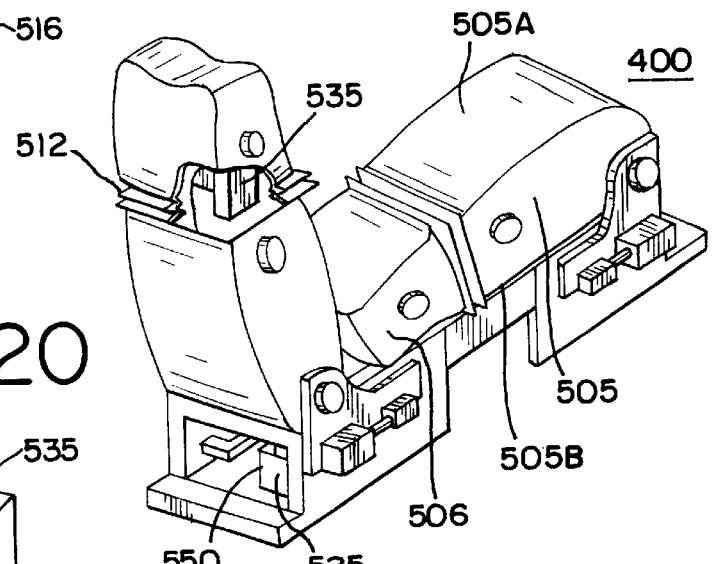
FIG. 19 is a perspective view of the vehicle seat assembly of FIG. 18 but illustrating the headrest portion, shown with portions broken away to show the air bag, in an extended position and the movable seat back portion in a downward position on the seat base to facilitate rearward facing passenger seating.

Referring now to FIGS. 18 and 19, shown is yet another alternate embodiment of a vehicle seat 500 for a vehicle (not shown) constructed in accordance with the present invention. The vehicle seat 500 may provide for both occupant travel facing in a forward or first direction, and occupant travel facing in a rearward or second direction. The vehicle seat 500 may include a seat frame 501 having a front flanged edge 502 and a posterior flanged edge 503 for securing the vehicle seat 500 directly to the vehicle floor (not shown). Alternatively, the seat frame 501 may be mounted to a conventional slidable track (not shown) enabling forward and backward horizontal positioning of the seat frame 501 with respect to the vehicle floor, if desired. In this embodiment, a position control arm 520 may be provided for the user to adjust the desired horizontal location of the vehicle seat 500 with respect to the vehicle floor.

The vehicle seat 500 may include a support assembly 504, which may be constructed of springs 504a and wire 504b arranged in a criss-cross pattern, seat backs 505 mounted on top of the seat frame 501, headrests 506 movably mounted to the seat backs 505, and back support assemblies 514 pivotally connecting the seat backs 505 to the seat frame 501. In one embodiment, a flexible, expandable cover 512, which may be for example accordion shaped, may be positioned and attached to the headrest 506 and the seat back 505 as shown in FIGS. 18 and 19.

When the seat back 505 is in the upright position at the posterior end 503 of the seat frame 501, the seat back 505, in combination with the seat frame 501 and the seat back 505 located at the front edge 502 when in the lowered position, provide for occupant travel facing in a forward or first direction. Seat back 505 may be pivotally connected to back support assembly 514 so that seat back 505 may be adjusted by the user to fit his or her preferred seating arrangement. In one embodiment, seat back 505 may be angularly adjusted by a angle adjuster mechanism 516 as shown in FIG. 19. Angular adjustment mechanism 516 may be positioned near the back support assembly 514 and may provide for the back rest 505 to be positioned in a large number of different angles with respect to seat frame 501. When in the downward position as shown in FIG. 19, the seat back 505 and headrest 506 may cover the seat frame 501 and may span an entire length and width of seat frame 501. Seat back 505 in the downward position may provide cushioned support for a seated occupant and may have a variable thickness (t), defined by a top surface 505a and a bottom surface 505b of the seat back 505. Located within seat back 505 and headrest 506 may be an inner extension frame assembly 528.

Figure 20:
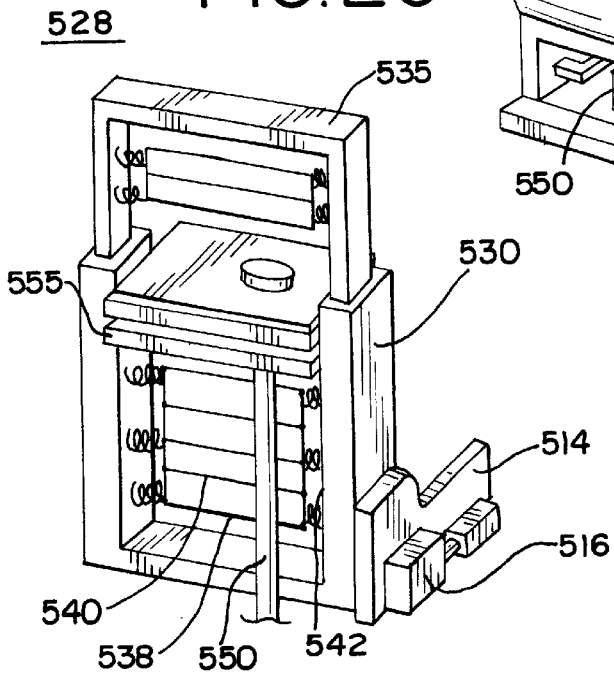
FIG. 20 is a perspective view of the extension frame located within the internal portion of the seat back and headrest portions of FIG. 19.

In one embodiment, as shown in FIG. 20, inner extension frame 528 may comprise an inner extension frame lower portion 530, an inner extension frame upper portion 535, a support frame 538 that stretches along and is connected to the frames 530 and 535 substantially as shown in FIG. 20, an extension air bag 555 and an air hose 550 connected to the air bag. In one embodiment, support frame 538 may be constructed of springs 542 and wire 540 arranged in a criss-cross pattern. Inner extension frame upper portion 535 may be located substantially within headrest 506 and inner extension frame lower portion 530 may be located within seat back 505. In one embodiment, air bag 555 is positioned as shown in FIG. 20 and is expandably connected to extension frames 530, 535. Also, in one embodiment an air pump 525 may be provided to deliver air through air hose 550 and into air bag 555. In another embodiment, an air inlet/outlet 510 may be provided to accept the air hose 550 so that the air hose 550 would be located external of the seat back 505. Also, air inlet/outlet 510 may be used to release the air and deflate air bag 555. This embodiment may provide for an emergency situation where the headrest 506 must be lowered but the vehicle's power system cannot operate the air pump 525. In yet other embodiments, headrest 506 may be manually extended away from seat back 505 by a user pulling the headrest 506 away from the seat back 505.

As shown in FIG. 19, during use, a passenger may push one of the seat backs 505 downward and into a lowered position on the seat frame 501. In one embodiment, the user may adjust the seat back angle adjuster mechanism 516 to control the angle of the seat back 505 with respect to the seat frame 501. As seat back 505 is being lowered into position, seat back 505 may pivot about back support assembly 514 with respect to seat frame 501. Once seat back 505 is completely in the lowered position, the headrest 506 of the second seat back 505, that is still in the upright position, may be raised away from seat back 505 so that the seat back 505 provides effectively more back rest support surface area for the user. In one embodiment, headrest 506 may be manually or automatically raised. For example, if headrest 506 is equipped to be automatically raised, the user simply activates air pump 525 which delivers air to air bag 555. As air bag 555 fills with air, it starts to expand and extend headrest 506 away from seat back 505. As headrest 506 is extending, cover 512 may similarly extend until headrest 506 is fully extended. In one embodiment, a locking switch 507 may be provided to lock the headrest 506 in the desired position. As shown in FIG. 19, this particular seat back 505 arrangement provides for a vehicle occupant to be positioned in the vehicle seat 500 so that the occupant is facing the opposite direction than the vehicle is traveling in.

While preferred embodiments of the present invention have been illustrated and described, it will be understood to those skilled in the art that changes and modifications may be made therein without departing from the invention in its broader aspects. Various features of the invention are defined in the following claims.

What is claimed is:

1. A vehicle seat, comprising:

a seat frame;

a seat base having a first seat back, a recess portion, an inner seat frame having at least two openings disposed on opposite ends of the inner seat and a means for pivotally connecting the first seat back to the seat base and providing for the first seat back to be removably positioned within the recess;

the first seat back further includes an inner support frame having at least two shafts disposed on opposite ends of the frame wherein each shaft extends past the first seat back;

the means for pivotally connecting the first seat back to the seat base includes at least two frame locking rods, one locking rod operatively positioned in each opening of the inner seat frame, two shaft guides each having an opening and connected to opposite ends of the inner seat frame and positioned to provide for each frame locking rod to slidably mount within the shaft guide opening and provide for each seat back inner frame opening to accept a frame locking rod when the first seat back is in an upright position; and a back support assembly having a second seat back, operatively associated with said seat base.

2. The vehicle seat of claim 1 wherein the first seat back and the seat base comprise an integral seat base structure.

3. The vehicle seat of claim 1 further including a spring operatively positioned around each frame locking rod between the shaft guide and the inner seat frame.

4. The vehicle seat of claim 1 wherein the first seat back is pivotally connected to the seat base distal the second seat back.

5. The vehicle seat of claim 1 wherein the first seat back can operatively pivot to a first position and a second position and where the first seat back is located substantially parallel to and inside the seat base recess in the first position and the first seat back is located substantially perpendicular to the seat base in the second position.

6. The vehicle seat of claim 1 wherein the first seat back further includes a means for lifting the first seat back.

7. The vehicle seat of claim 1 wherein each shaft guide further comprises a spring and a spring plate operatively connected to the spring and slidably mounted within each shaft guide and adjacent each locking rod portion positioned in each shaft guide.

8. A vehicle seat enabling a person to face in a first direction and a second direction, comprising:

a seat frame;

a first seat back and a second seat back, said first seat back and second seat back pivotally connected to the seat frame wherein the first seat back is pivotally movable to a first position and the second seat back is pivotally movable to a second position in a manner enabling the person to rest his back against the first seat back and sit on the second seat back while facing in a first direction and wherein the first seat back is pivotally movable to a second position and the second seat back is pivotally movable to a first position in a manner enabling the person to rest his back against the second seat back and sit on the first seat back while facing in a second direction.

9. The vehicle seat of claim 8 wherein the first seat back and the second seat back each further comprise a headrest movably connected to each seat back distal the seat frame.

10. The vehicle seat of claim 9 further comprising two inner seat frames wherein one frame is positioned within the first seat back and the first headrest and one frame is positioned within the second seat back and the second headrest.

11. The vehicle seat of claim 10 wherein the inner seat frames can expand to provide for the first headrest to be extendably connected to the first seat back and for the second headrest to be extendably connected to the second seat back.

12. The vehicle seat of claim 11 further comprising an air bag extendably connected to each inner seat frame, an air hose sealably connected to each air bag and a means for inflating the air bags to provide for the headrests to extend away from the seat backs as the inner seat frame expands.

13. The vehicle seat of claim 12 wherein the means for inflating the air bags is an air pump.

14. The vehicle seat of claim 12 further comprising at least one air cap attached to at least one seat back wherein the air cap can provide for manual deflation of the air bag.

15. The vehicle seat of claim 9 further comprising two flexible covers wherein one flexible cover is operatively attached to the first seat back and the first headrest and the second flexible cover is operatively attached to the second seat back and the second headrest.

16. The vehicle seat of claim 8 further comprising two means for locking the first seat back and the second seat back in a fixed position relative to the seat frame.

17. The vehicle seat of claim 8 further comprising a locking switch mounted to the first headrest and the second head rest to enable each headrest to lock in a fixed position relative to each seat back.

18. A vehicle seat, comprising:

a seat frame;

a first seat back and a second seat back, wherein said first seat back and said second seat back are each pivotally connected to opposite ends of the seat frame; and a first headrest operably connected to an upper portion of the first seat back and a second headrest operably connected to an upper portion of the second seat back.

* * * * *